United States Patent
Yoshida et al.

(10) Patent No.: US 8,000,648 B2
(45) Date of Patent: Aug. 16, 2011

(54) RADIO COMMUNICATIONS SYSTEM AND ANTENNA PATTERN SWITCHING

(75) Inventors: Makoto Yoshida, Kawasaki (JP); Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 826 days.

(21) Appl. No.: 11/826,730

(22) Filed: Jul. 18, 2007

(65) Prior Publication Data

US 2008/0045143 A1 Feb. 21, 2008

(30) Foreign Application Priority Data

Aug. 18, 2006 (JP) ................. 2006-222939

(51) Int. Cl.
*H04B 3/36* (2006.01)
*H04B 7/14* (2006.01)
(52) U.S. Cl. ..... 455/7; 455/575.7; 455/562.1; 455/13.1; 455/11.1; 455/16; 370/315; 370/334
(58) Field of Classification Search .............. 455/575.7, 455/15, 517, 101, 562.1, 7, 13.1, 16, 11.1, 455/63.4, 25; 370/338, 315, 319, 466, 331, 370/238, 332, 334
See application file for complete search history.

(56) References Cited

U.S. PATENT DOCUMENTS

| | | | |
|---|---|---|---|
| 7,099,698 B2* | 8/2006 | Tarokh et al. | 455/562.1 |
| 7,321,580 B1* | 1/2008 | Ramanathan et al. | 370/339 |
| 7,720,020 B2* | 5/2010 | Larsson | 370/315 |
| 2002/0036587 A1* | 3/2002 | Martin et al. | 342/375 |
| 2005/0232183 A1* | 10/2005 | Sartori et al. | 370/319 |
| 2006/0264184 A1* | 11/2006 | Li et al. | 455/101 |
| 2007/0165881 A1* | 7/2007 | Ramakrishnan et al. | 381/94.1 |
| 2008/0045147 A1* | 2/2008 | Okuda | 455/15 |
| 2008/0056172 A1* | 3/2008 | Nakatsugawa | 370/315 |
| 2008/0165720 A1* | 7/2008 | Hu et al. | 370/315 |
| 2009/0003378 A1* | 1/2009 | Sachs | 370/466 |

FOREIGN PATENT DOCUMENTS

| | | |
|---|---|---|
| JP | 11-266228 | 9/1999 |
| KR | 1020050027896 A | 12/2003 |
| KR | 20040069465 A | 6/2004 |

OTHER PUBLICATIONS

Korean Office Action dated Apr. 27, 2009 for 10-2007-0080572.

* cited by examiner

*Primary Examiner* — Sujatha Sharma
(74) *Attorney, Agent, or Firm* — Fujitsu Patent Center (57) ABSTRACT

A radio communications system having a radio base station and a radio relay station is disclosed. A terminal performs radio communications through a link with the radio base station or a link with the radio base station via the radio relay station. The radio base station includes an antenna gain pattern switching part configured to switch between an omnidirectional antenna gain pattern and an adaptive array antenna gain pattern forming a beam; and a control part configured to direct the beam to the terminal in one of an extended service area covered by the adaptive array antenna gain pattern outside a regular service area covered by the omnidirectional antenna gain pattern and the service area of the radio relay station by causing the antenna gain pattern switching part to switch to the adaptive array antenna gain pattern.

14 Claims, 9 Drawing Sheets a : REGULAR SERVICE AREA
b : AAS-EXTENDED AREA
c : RS-COVERED AREA

FIG.1 a : REGULAR SERVICE AREA
b : AAS-EXTENDED AREA
c : RS-COVERED AREA

FIG.5 a : REGULAR SERVICE AREA
b : AAS-EXTENDED AREA
c : RS-COVERED AREA

FIG.6

| METHOD | CONTROL INFORMATION | USER DATA |
|---|---|---|
| 1 | BS/MS (BEAM FORMING) | BS/MS (BEAM FORMING) |
| 2 | BS/RS/MS | BS/MS (BEAM FORMING) |
| 3 | BS/RS/MS | BS/RS/MS |

FIG.7

FIG.8 a : REGULAR SERVICE AREA
b : AAS-EXTENDED AREA
c : RS-COVERED AREA

FIG.9 a : REGULAR SERVICE AREA
b : AAS-EXTENDED AREA
c : RS-COVERED AREA

RADIO COMMUNICATIONS SYSTEM AND ANTENNA PATTERN SWITCHING

BACKGROUND OF THE INVENTION

1. Field of the Invention

The present invention relates generally to radio communications systems and radio communications control methods, and more particularly to a radio communications system and a radio communications control method including a radio base station, a radio relay station, and a mobile terminal.

2. Description of the Related Art

There are various known radio communications systems, of which W-CDMA has been in practical use for cellular phones. Further, WiMAX (Worldwide Interoperability for Microwave Access) has also been developed as a high-speed transmission system. Further, adaptive array antenna systems have been known as a technology for improving signal-to-interference-and-noise ratio (SINR) in the radio communications between a radio base station and a mobile or fixed terminal. These adaptive array antenna systems are roughly divided into those using beamforming that has the object of increasing signal power to a terminal and those using nullforming that has the object of reducing interference power to other terminals.

In the case of applying such adaptive array antenna systems, a radio base station needs to detect the existence of a terminal and its direction. It is common to use broadcast information (a broadcast message) in order to perform a network entry operation (terminal sensing) for such detection. It is assumed that this broadcast information can be received by all terminals in the area of the radio base station. Therefore, usually, the broadcast information is transmitted with an omnidirectional antenna. This is because if the position of a terminal is not determined, it is not possible to form a beam in the direction of the terminal. Since the omnidirectional antenna is smaller in gain than a directional antenna that forms a beam, the radius of its service area is reduced. Accordingly, terminals outside the service area of the omnidirectional antenna cannot receive communications services.

Therefore, the following two methods are proposed. According to the first method, with respect to the downlink, a radio base station repeatedly transmits broadcast information while a terminal calculates its time average to improve the SNR (signal-to-noise ratio) to a minimum acceptable level for reception, and receives the broadcast information. With respect to the uplink, the terminal also repeatedly transmits a response so as to notify the radio base station of its existence. On the other hand, according to the second method, with respect to the downlink, a radio base station preforms a beam and performs scanning while rotating the beam 360 degrees, and a terminal performs intermittent reception to receive broadcast information when the beam is oriented in the direction of the terminal. With respect to the uplink, the terminal repeatedly transmits a response so as to notify the radio base station of its existence the same as described above. In the case of applying either the first or the second method, a retransmission control sequence intervenes in a normal communications sequence. As a result, in either the first or the second method, it takes a long time before network entry, and the amount of processing increases in both the radio base station and the terminal. Further, neither the first nor the second method always ensures network entry, so that there also remains a problem in terms of service provision. To help this, regarding only the downlink, power boosting for broadcast information is well known but this increases the interference to other cells (this means it is not effective for SINR improvement, although effective for SNR improvement) and the problem for the power amplifier unit from a linearity perspective.

Further, a radio communications system having a radio relay station that relays transmission to and from a radio base station is known. The radio relay station is provided in order to cover the dead zone (holes) of the service area of the radio base station or to expand the service area of the radio base station. However, this results in addition of the link between the radio base station and the radio relay station and the link between the radio relay station and a terminal to the existing link between the radio base station and the terminal, thus reducing transmission efficiency. In particular, an increase in the number of links that go through the radio relay station results in a significant decrease in transmission efficiency. Therefore, the number of terminals that can communicate through the radio relay station is limited.

Further, according to a known configuration, a transmission array antenna, a transmission beam former, a reception array antenna, and a reception beam former are provided in a radio base station of a radio communications system to which W-CDMA is applied. Multiple incoming (uplink) beams are formed by processing by the reception beam former, and one of the incoming beams that maximizes reception power is selected to perform reception. Processing is performed by the transmission beam former so as to form a transmission beam in the direction of the selected incoming beam, and transmission is performed from the transmission array antenna. If no incoming (uplink) signal from a terminal is received for a predetermined period of time, the transmission beam former is controlled so as not to form a transmission beam toward the terminal. (See, for example, Japanese Laid-Open Patent Application No. 11-266228.) According to Japanese Laid-Open Patent Application No. 11-266228, multiple transmission and reception beams are preformed, and after recognizing a network entry request from a terminal, a beam is directed. This is based on the premise of fixed beam formation (so-called switched beam), and beam control adaptive to the movement of the terminal cannot be performed. Therefore, a handover or switching beams because of the movement of the terminal frequently occurs.

It is possible to expand the moving range of a terminal where communications are performable by providing a radio relay station in order to expand the service area or to cover the dead zone of the service area of a radio base station in a radio communications system and by applying an adaptive array antenna system to the radio base station. As described above, however, this results in a long period of time being required before network entry. It also causes the problem of reduction in transmission efficiency due to formation of the link between the radio relay station and the radio base station, the link between the radio relay station and the terminal, and the link between the radio base station and the terminal in the case of the terminal communicating with the radio base station through the radio relay station.

SUMMARY OF THE INVENTION

Embodiments of the present invention may solve or reduce one or more of the above-described problems.

According to one embodiment of the present invention, there is provided a radio communications system and a radio communications control method in which one or more of the above-described problems may be solved or reduced.

According to one embodiment of the present invention, the link between a radio base station and a terminal is promptly established, and transmission efficiency is prevented from being reduced.

According to one embodiment of the present invention, there is provided a radio communications system having a radio base station and a radio relay station, where a terminal performs a radio communication through a link with the radio base station or a link with the radio base station via the radio relay station, wherein the radio base station includes an antenna gain pattern switching part configured to switch between an omnidirectional antenna gain pattern and a directional antenna gain pattern; and a control part configured to direct a beam to the terminal in one of an extended service area covered by the directional adaptive array antenna gain pattern outside a regular service area covered by the omnidirectional antenna gain pattern and a service area of the radio relay station by causing the antenna gain pattern switching part to switch to the directional adaptive array antenna gain pattern.

According to one embodiment of the present invention, there is provided a radio communications control method performing a radio communication between a radio base station and a terminal with the radio base station including a part configured to switch an omnidirectional antenna gain pattern and a directional adaptive array antenna gain pattern, and one or more radio relay stations each configured to relay the radio communication between the radio base station and the terminal, the radio communications control method including the step of the radio base station performing the radio communication between the radio base station and the terminal by forming a beam for the terminal based on the directional adaptive array antenna gain pattern in response to reception of control information from the terminal through the one or more radio relay stations.

According to one aspect of the present invention, a terminal outside a regular service area covered by the omnidirectional antenna gain pattern of a radio base station notifies the radio base station of its existence through a radio relay station. Thereby, the radio base station promptly recognizes the network entry of the terminal, and switches to an adaptive array antenna gain pattern so as to direct a beam toward the direction of the radio relay station where the terminal is positioned. As a result, a link is promptly established to enable the radio base station and the terminal to perform direct radio communications with each other. Further, by providing the radio relay station with a part configured to form a beam based on an adaptive array antenna, it is possible to form multiple links and reduce the number of hops to provide efficient radio communications services.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

First Embodiment

Figure 1:
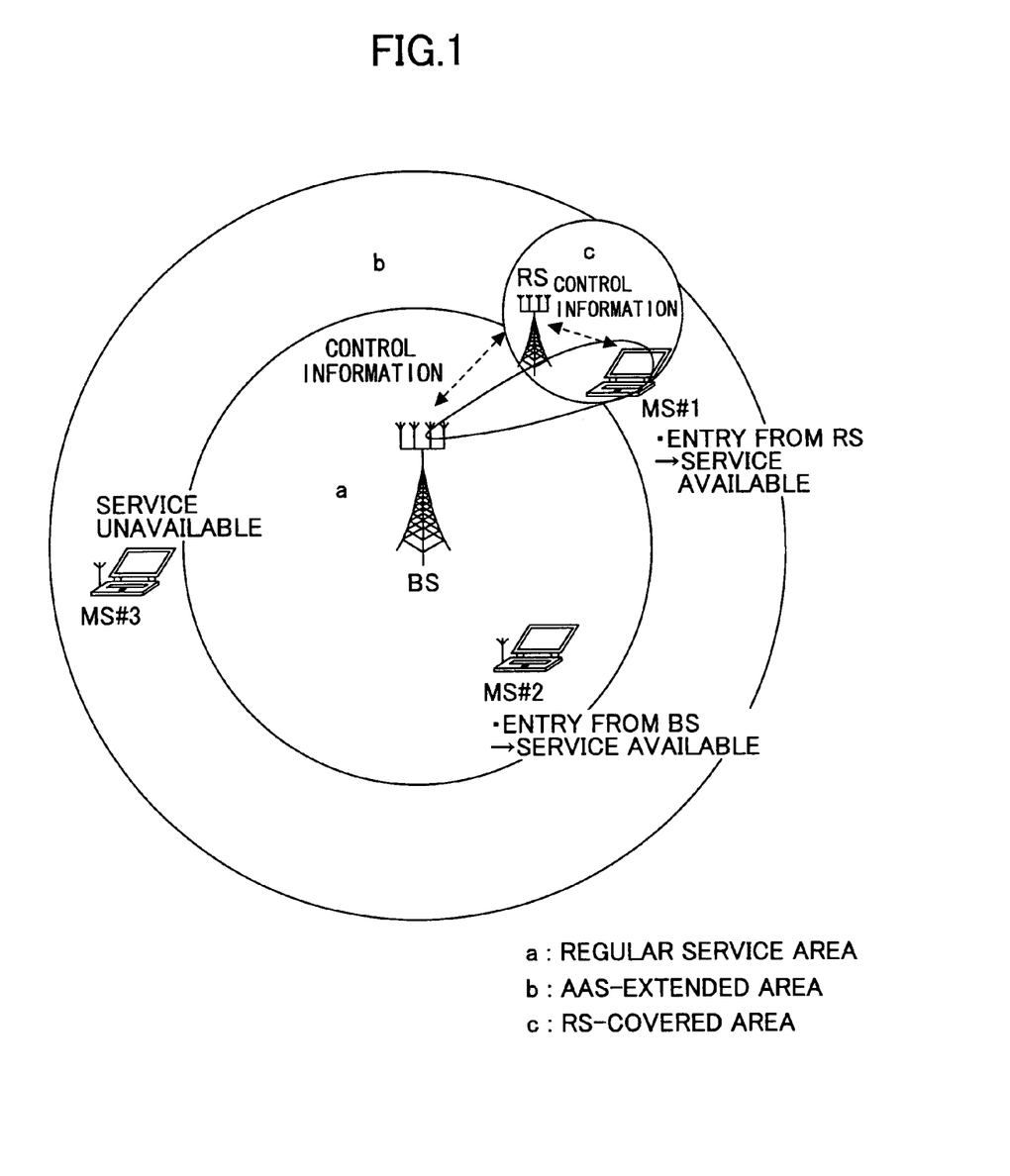
FIG. 1 is a diagram for illustrating service areas according to a first embodiment of the present invention.

FIG. 1 is a diagram showing the relationship between the disposition of a radio base station (hereinafter also abbreviated as "BS"), terminals or mobile stations (hereinafter also abbreviated as "MS#1, MS#2, and MS#3), and a radio relay station (hereinafter also abbreviated as "RS") and service areas according to a first embodiment of the present invention. As examples of service areas, FIG. 1 shows a regular service area a, which is a service area in the case where the BS performs no beamforming or forms no beam; an AAS-extended area b, which is an extended service area in the case where beamforming by an adaptive array system (AAS) or a system according to a directional antenna gain pattern is performed; and an RS-covered area c, which is a service area covered by the RS. Further, as examples of terminals, FIG. 1 shows the MS#1 in the regular service area a, the MS#2 in the AAS-extended area b, and the MS#3 in the RS-covered area c.

Referring to FIG. 1, a radio communications system according to this embodiment includes the radio base station BS and the radio relay station RS. The MS#2 performs radio communications through the link with the radio base station BS, and the MS#1 performs radio communications through the link with the radio base station BS via the radio relay station RS. In this radio communications system, the radio base station BS includes an antenna gain pattern switching part configured to switch an omnidirectional antenna gain pattern and a directional adaptive array antenna gain pattern that forms a beam to the destination; and a control part configured to direct the beam to the MS#1 in the extended service area b covered by the directional adaptive array antenna gain pattern outside the regular service area a covered by the omnidirectional antenna gain pattern or in the service area c of the radio relay station RS by causing the antenna gain pattern switching part to switch the antenna gain pattern to the directional one.

A radio communications control method according to this embodiment includes a radio base station BS including a part configured to switch an omnidirectional antenna gain pattern and an adaptive array antenna gain pattern that forms a beam to the destination, and a radio relay station RS that relays radio communications between the radio base station BS and an MS; and performs the radio communications between the radio base station BS and the MS. This radio communications control method includes the process of the radio base station BS performing the communications between the radio base station BS and the MS by forming a beam for the MS based on the adaptive array antenna gain pattern in response to reception of control information from the MS through the radio relay station RS.

Figure 2:
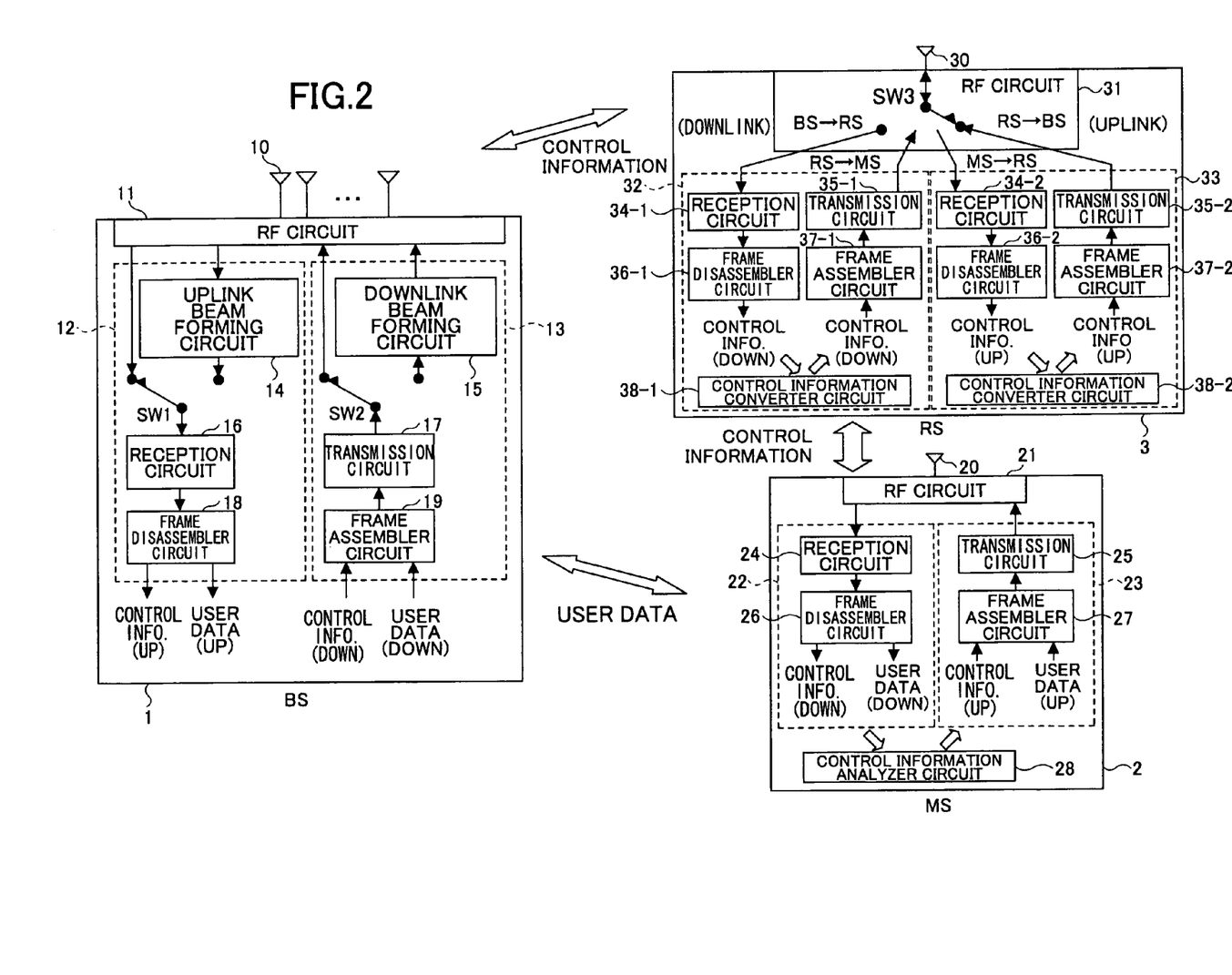
FIG. 2 is a diagram for illustrating the first embodiment of the present invention.

FIG. 2 is a diagram for illustrating the first embodiment. In FIG. 2, the radio base station (BS) is referred to by reference numeral 1, the terminal (MS) is referred to by reference numeral 2, and the radio relay station (RS) is referred to by reference numeral 3. The radio base station 1 includes an array antenna 10, an RF (high frequency) circuit 11, a reception part 12, and a transmission part 13. The reception part 12 includes an uplink beam forming circuit 14, a reception circuit 16, a frame disassembler circuit 18, and a switching circuit SW1. The frame disassembler circuit 18 separates control information and user data. The transmission part 13 includes a downlink beam forming circuit 15, a transmission circuit 17, a frame assembler circuit 19, and a switching circuit SW2. The frame assembler circuit 19 generates a frame containing control information and user data. A control part formed of a processor to control each part is not graphically illustrated. The radio base station 1 is connected to a core network. The configuration of this connection is not graphically illustrated, either. The switching circuits SW1 and SW2 switch the antenna gain pattern of the array antenna between an omnidirectional antenna gain pattern and a directional one. The switching circuits SW1 and SW2 together with the uplink beam forming circuit 14 and the downlink beam forming circuit 15 form an antenna gain pattern switching part. Switching parts based on various electronic circuits can be applied as the antenna gain pattern switching part.

The terminal (MS) 2 is mobile and directly operated by a user. The terminal 2 includes an RF (high frequency) circuit 21, a reception part 22, a transmission part 23, and a control information analyzer circuit 28. The reception part 22 includes a reception circuit 24 and a frame disassembler circuit 26. The transmission part 23 includes a transmission circuit 25 and a frame assembler circuit 27. The frame disassembler circuit 26 separates control information and user data in the processing of reception. The control information analyzer circuit 28 analyzes the control information. The control information analyzer circuit 28 inputs uplink control information as required, together with uplink user data, to the frame assembler circuit 27, so that the uplink control information and user data are transmitted through the transmission circuit 25. A control part configured to control each part, a user operations input/output part, and a display part are not graphically illustrated.

The radio relay station (RS) 3 includes an antenna 30, an RF (high frequency) circuit 31, a downlink processing part 32, and an uplink processing part 33. The downlink processing part 32 includes a reception circuit 34-1, a transmission circuit 35-1, a frame disassembler circuit 36-1, a frame assembler circuit 37-1, and a control information converter circuit 38-1. The uplink processing part 33 includes a reception circuit 34-2, a transmission circuit 35-2, a frame disassembler circuit 36-2, a frame assembler circuit 37-2, and a control information converter circuit 38-2. A control part including a processor to control each part is not graphically illustrated. The antenna 30 is shown as a regular omnidirectional antenna, but may also be an array antenna to form a beam the same as in the radio base station 1. The RF circuit 31 includes a switching circuit SW3.

When the switching circuits SW1 and SW2 of the radio base station 1 are switched as shown in FIG. 2, the uplink beam forming circuit 14 and the downlink beam forming circuit 15 are not connected. Accordingly, the array antenna 10 has an omnidirectional antenna gain pattern, so that the radio base station 1 can perform direct radio communications with the terminal 2 in the regular service area a in FIG. 1. Further, switching the switching circuit SW1 so as to connect the uplink beam forming circuit 14 between the reception circuit 16 and the RF circuit 11 makes it possible to form a reception beam (uplink beam) by antenna weighting by the uplink beam forming circuit 14. Further, switching the switching circuit SW2 so as to connect the downlink beam forming circuit 15 between the transmission circuit 17 and the RF circuit 11 makes it possible to form a transmission beam (downlink beam) by antenna weighting by the downlink beam forming circuit 15. That is, the omnidirectional antenna gain pattern and the adaptive array antenna gain pattern can be switched with the antenna gain pattern switching part including the switching circuits SW1 and SW2.

The radio relay station 3 is shown as including the downlink processing part 32 and the uplink processing part 33 that relay (receive and transmit) control information, but may also be configured to include a part that relays (receives and transmits) user data. Each of the control information converter circuits 38-1 and 38-2 is configured to convert and relay control information based on the determination by the control part (not graphically illustrated) or on pregiven conditions. For example, the control information converter circuit 38-1 converts control information in the case of converting control information from the radio base station 1, which contains information indicating only a band where communications are performable, into control information indicating a band to be allocated to a subordinate terminal of the radio relay station 3, and transmitting the converted control information through the downlink. The control information converter circuits 38-1 and 38-2 may be omitted from the radio relay station 30, so that the radio relay station 30 is configured to only relay (receive and transmit) control information between the radio base station 1 and the terminal 2. The terminal 2 is capable of performing radio communications with the radio base station 1 or the radio relay station 3. In the illustrated state of FIG. 2, the radio base station 1 transmits control information through the omnidirectional antenna gain pattern, and the radio relay station 3 relays this control information. The terminal 2 receives the control information through the radio relay station 3, and performs entry transmission to the radio base station 1. The radio base station 1 transmits user data to and receives user data from the terminal 2 through the adaptive array antenna gain pattern.

Figure 3:
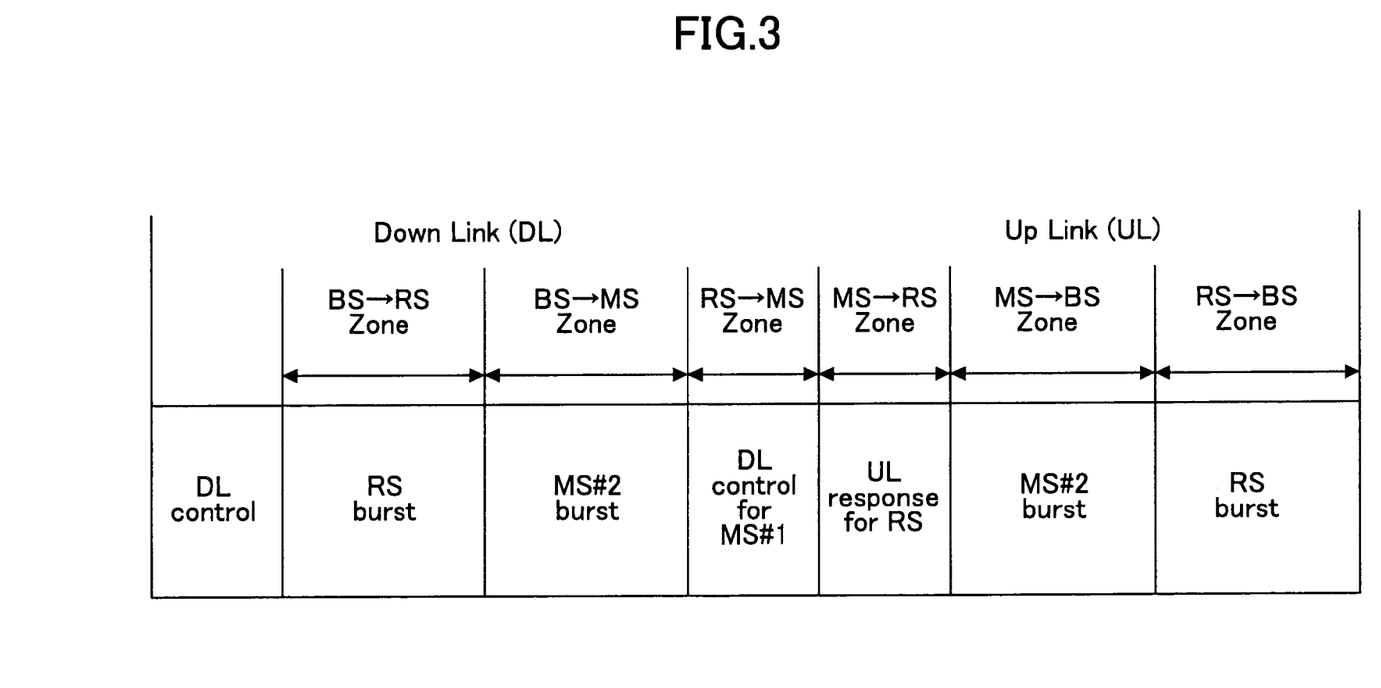
FIG. 3 is a diagram for illustrating a frame format according to the first embodiment of the present invention.
Figure 4:
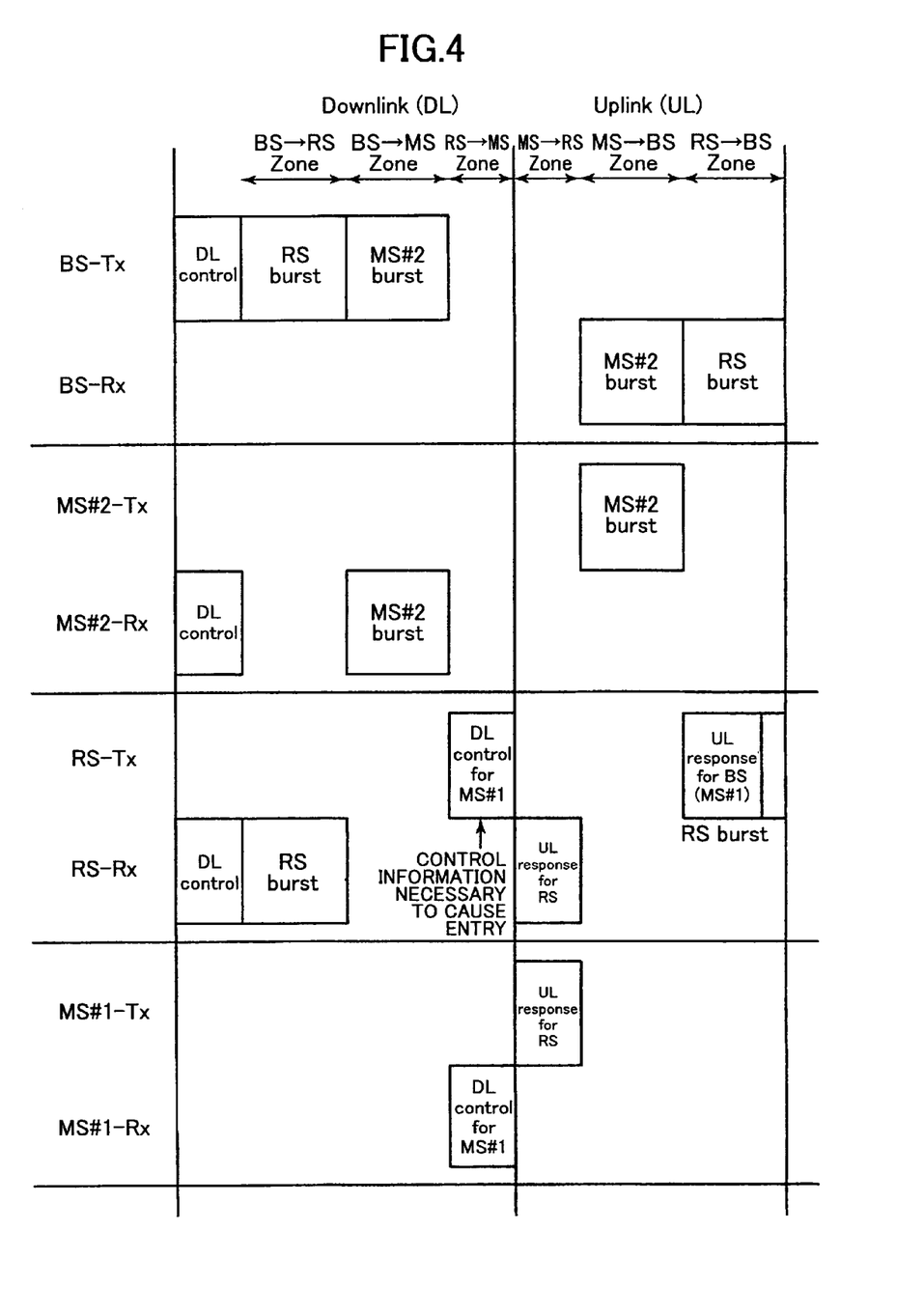
FIG. 4 is a diagram for illustrating a transmission and reception frame according to the first embodiment of the present invention.

FIG. 3 is a diagram for illustrating a frame format according to the first embodiment of the present invention. FIG. 3 shows a frame configuration in the case of applying TDD (Time Division Duplex) to perform full duplex communications. FIG. 3 shows the downlink (DL) and uplink (UL) contents of a frame with respect to the MS#2 in the regular service area a and the MS#1 in the RS-covered area c in FIG. 1. Referring to FIG. 3, "DL control" at the head of the frame is a transmitted downlink control signal. A burst signal "RS burst" transmitted from the radio base station 1 to the radio relay station 3 is shown in "BS→RS Zone." A burst signal "MS#2 burst" transmitted from the radio base station 1 to the terminal 2 (MS#2) is shown in "BS→MS Zone." A downlink control signal "DL control for MS#1" transmitted from the radio relay station 3 to the terminal 2 (MS#1), which is information necessary to cause the MS#1 to make an entry, is shown in "RS→MS Zone." A response signal "UL response for RS" from the terminal 2 (MS#1) to the radio relay station 3 is shown in "MS→RS Zone." A burst signal "MS#2 burst" transmitted from the terminal 2 (MS#2) to the radio base station 1 is shown in "MS→BS Zone." A burst signal "RS burst" transmitted from the radio relay station 3 to the radio base station 1 is shown in "RS→BS Zone." FIG. 4 is a diagram in which the frame contents shown in FIG. 3 are shown divided into transmission Tx and reception Rx in each of the radio base station (BS) 1, the MS#2 (terminal), the radio relay station (RS) 3, and the MS#1 (terminal). The BS 1 switches the switching circuit SW2 (FIG. 2) so as to connect the RF circuit 11 and the transmission circuit 17 so that the array antenna 10 has an omnidirectional antenna gain pattern. Then, the BS 1 transmits control information (broadcast information) (DL control) with a DL sub-frame. The RS 3 connects the RF circuit 31 and the reception circuit 34-1 of the downlink processing part 32 through the switching circuit SW3. The control information (downlink) is separated in the frame disassembler circuit 36-1. The control information (downlink) is supplied directly or after being converted in the control information converter circuit 38-1 as required to the frame assembler circuit 37-1 so that a frame is formed in the frame assembler circuit 37-1. The RS 3 connects the transmission circuit 35-1 and the RF circuit 31 through the switching circuit SW3 at a time of transmission, and transmits the control information. That is, the RS 3 receives the control information of the BS 1, and transmits the control information to the MS#1 in the RS-covered area c (DL control for MS#1). The RS 3 may directly transfer control information transmitted from the BS 1 as control information to the MS#1. Alternatively, the RS 3 may also extract and process information desired to be controlled in the control information converter circuit 38-1 as described above, and transmit the processed information as control information.

The MS#1 receives the control information from the RS 3, and transmits response information (UL response for RS) to the RS 3. At this point, the MS#1 may be either aware or unaware of the existence of the RS 3. In the latter case, the MS#1 takes the RS 3 for the BS 1 in making a response. The RS 3 receives the response information from the MS#1, and processes the response information in the uplink processing part 33 (FIG. 2). Then, the RS 3 transmits the response information to the BS 1 so as to notify the BS 1 of the existence of the MS#1. Here, the RS 3 also notifies the BS 1 that it is necessary for the BS 1 to form a beam based on the adaptive array antenna gain pattern in order to communicate directly with the MS#1. That is, the RS 3 notifies the BS 1 that the MS#1 is not in the regular service area a, but in the RS-covered area c corresponding to the AAS-extended area b. As a result, the BS 1 switches to the adaptive array antenna gain pattern to form a beam toward the RS 3, and starts to communicate with the MS#1. That is, the BS 1 connects the transmission circuit 17 and the downlink beam forming circuit 15 through the switching circuit SW2 at a time of transmission to the MS#1. Since the BS 1 knows the location of the RS 3 from the beginning, the BS 1 forms a beam in the direction of the RS 3, where the MS#1 is positioned. That is, the BS 1 switches the switching circuits SW1 and SW2 in accordance with reception and transmission timing, and performs reception and transmission by beam forming through the functions of the uplink beam forming circuits 14 and the downlink beam forming circuits 15. It is also possible to apply control where the BS 1 determines to continue communicating with the MS#1 through the RS 3 without forming a beam for the MS#1.

The determination as to whether to switch to the weighted antenna gain pattern that forms a beam for the MS#1 may also be made with the determination function of the RS 3 to notify the BS 1 of the determination through request information in the response information (UL response for BS (MS#1)) from the RS 3 to the BS 1, instead of being achieved as the determination function of the BS 1. In this case, the BS 1 transmits to the RS 3 an authorization or rejection response to the request information from the RS 3 in the next frame. Alternatively, the BS 1 may form a beam and perform direct transmission to the MS#1 (authorization) or store data on the MS#1 (rejection) without responding to the request information.

Since the MS#2 is positioned in the regular service area a, the BS 1 switches the switching circuits SW1 and SW2 (FIG. 2) so as to connect the reception circuit 16 and the transmission circuit 17 to the RF circuit 11, and performs reception from and transmission to the MS#2 with the omnidirectional antenna gain pattern at times of reception from and transmission to the MS#2.

Second Embodiment

Figure 5:
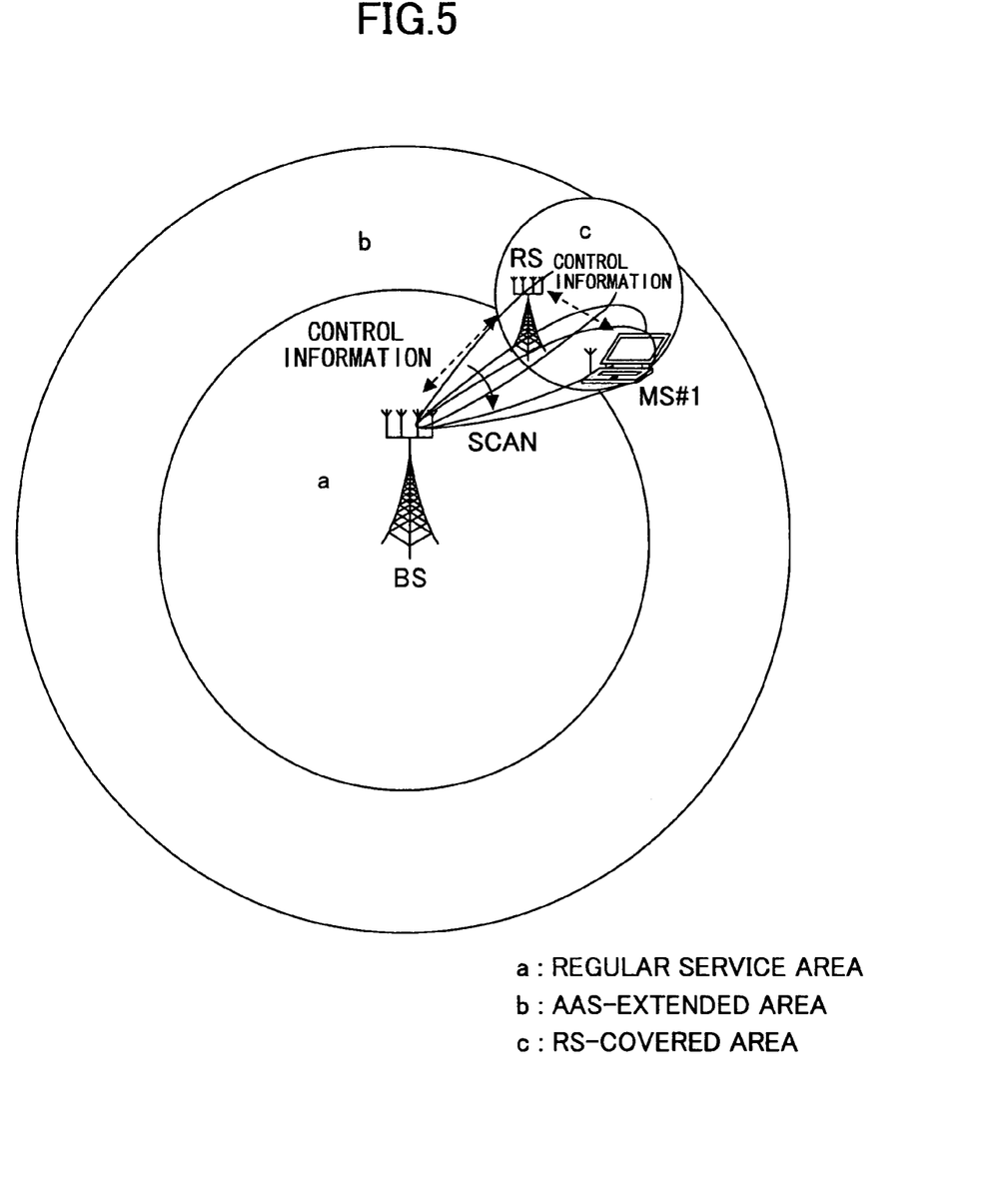
FIG. 5 is a diagram for illustrating a second embodiment of the present invention.

FIG. 5 is a diagram for illustrating a second embodiment of the present invention. The regular service area a covered by the omnidirectional antenna gain pattern of the BS, the AAS-extended area b, which is an area extended based on the directional adaptive array antenna gain pattern, and the RS-covered area c, which is the service area of the RS, are the same as in the case shown in FIG. 1. Further, the BS, the RS, and the terminal (MS#1) have the same configurations as those shown in FIG. 2. When the BS recognizes (or determines) from response information from the MS#1 through the RS that the MS#1 is positioned in the RS-covered area c, the BS performs control to direct a beam toward the RS. It is requested that the direction of the beam be optimized. For this purpose, the BS causes the beam to scan so as to cover the entire RS-covered area c. The BS is notified of the resulting reception conditions, for example, the measurement results by SINR measurement means, of the MS#1 by control information through the relay link of BS/RS/MS#1. Since the BS can recognize a beam direction that optimizes the reception condition of the MS#1, the BS can determine the beam direction for the MS#1 based on the adaptive array antenna gain pattern. Accordingly, even when the RS-covered area c is relatively wide, it is possible to swiftly optimize the beam direction from the BS and transmit user data to and receive user data from the MS#1.

Further, if it is possible to notify the BS of the position information (for example, position measurement information by GPS) of the MS#1 using uplink response information, the BS can swiftly control the beam direction for the MS#1 without performing the above-described scanning. In this case, it is possible to further increase reception quality in the MS#1 by measuring reception quality information and notifying the BS of the measured reception quality information as uplink response information as described above.

Figure 6:
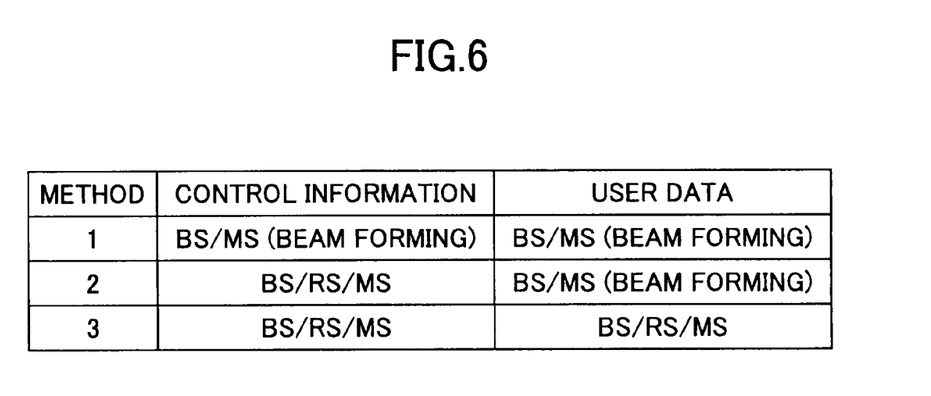
FIG. 6 is a table for illustrating forms of communicating with a terminal in an RS-covered area according to the second embodiment of the present invention.

FIG. 6 is a table showing forms of communications with the MS#1 in the RS-covered area c. In FIG. 6, forms of communicating control information and user data after the network entry of the MS#1 are shown as Methods 1 through 3. According to Method 1, control information and user data are communicated by beam forming without intervention of the RS as indicated as BS/MS. According to Method 2, control information is communicated via the RS as BS/RS/MS, while user data are communicated by beam forming as BS/MS. According to Method 3, control information is communicated via the RS as BS/RS/MS the same as in Method 2, and user data are also communicated via the RS as BS/RS/MS.

The RS cannot accommodate a greater number of users than the BS as long as the RS communicates through the link between the BS and the RS and the link between the RS and the MS#1 using time slots in the frame format of the BS. Further, according to the frame format shown in FIGS. 1 and 3, as the user capacity of the RS increases, the number of MSs (users) that can connect to the BS decreases. Further, since the relay link through the RS occupies the above-described two links (time slots), a significant decrease in transmission efficiency is undeniable. Therefore, in order to maintain the throughput of the entire system, the user capacity of the RS may be preset by a service provider or the RS may notify the BS in advance of its user capacity in the communication between the BS and the RS. When more users (MSs) than the user capacity, that is, radio resources (frequency bandwidth), of the RS make network entries using control information through the RS, the BS connected to a core network can connect to an MS without intervention of the RS by beam forming, and store user data in the time slot between the BS and the MS. In general, control information is communicated at lower rates than user data information. Therefore, the BS selects a control/data communication method that maximizes the system throughput from those of the terminal (MS#1) in the RS-covered area c. In this case, after the network entry, a BS-MS direct link (BS/MS) and relay link communications (BS/RS/MS) are selected. Since this processing is the sharing of radio resources between the BS and the RS, this processing can be applied even when the terminal (MS#1) in the RS-covered area c can directly receive the control information of the BS.

Third Embodiment

Figure 7:
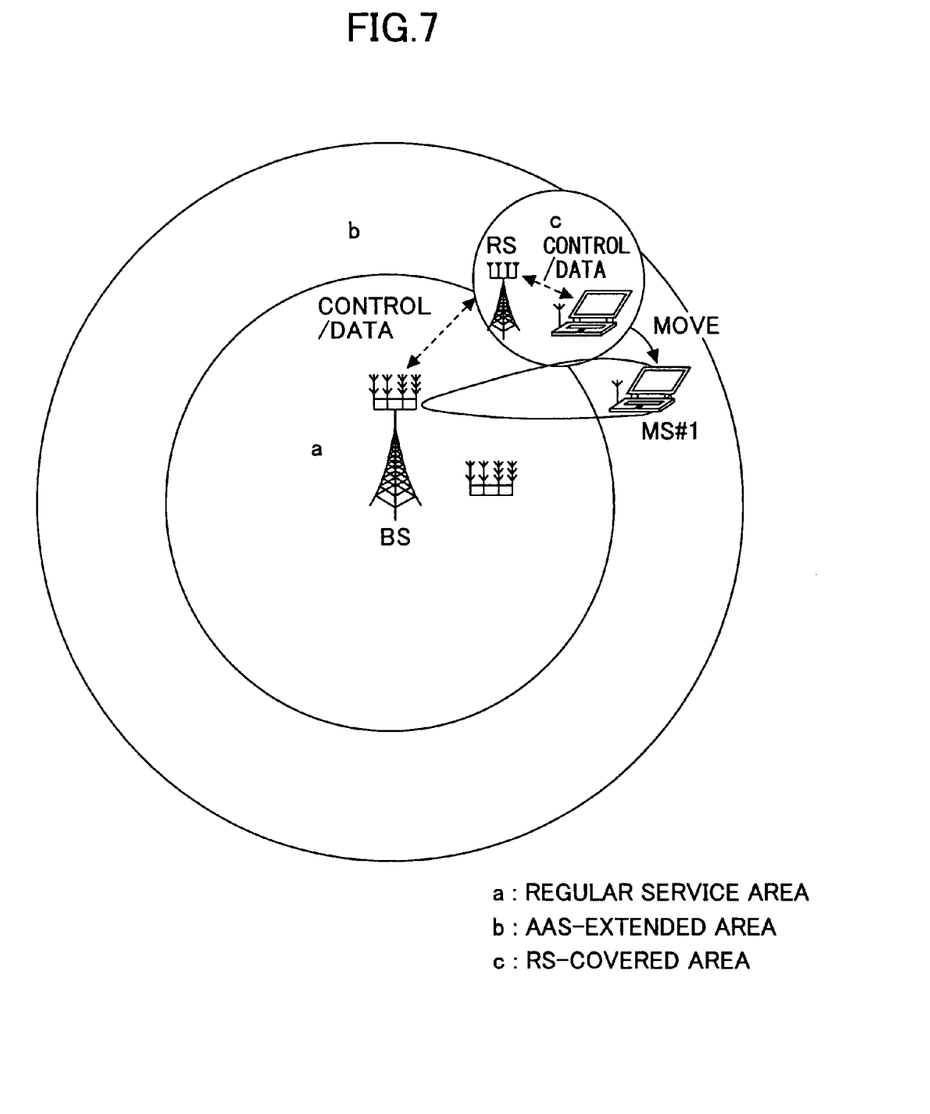
FIG. 7 is a diagram for illustrating a third embodiment of the present invention.

FIG. 7 is a diagram for illustrating a third embodiment of the present invention. The regular service area a covered by the omnidirectional antenna gain pattern of the BS, the AAS-extended area b, which is an area extended based on the directional adaptive array antenna gain pattern, and the RS-covered area c, which is the service area of the RS, are the same as in the case shown in FIG. 1. Further, the BS, the RS, and the terminal (MS#1) have the same configurations as those shown in FIG. 2. When the MS#1 in the RS-covered area c moves to the AAS-extended area b outside the RS-covered area c when the MS#1 is performing communications according to the communication form of Method 3 (BS/RS/MS) of FIG. 6, that is, performing transmission and reception of control information and user data through the RS as indicated by broken arrows as control/data, it is necessary to switch the communication form to Method 1 (BS/MS [beam forming]). In this case, monitoring reception quality in the BS increases the amount of information between the BS and the RS.

Therefore, the RS monitors reception quality using the link between the RS and the MS#1. When the RS determines that a handover is necessary because the reception quality is lower than or equal to a predetermined value (level), the RS transmits a request for a handover including beam forming to the BS. Thereby, it is possible to prevent an increase in the amount of transmission control information between the BS and the RS, and to provide a preparation period for beam forming in the BS.

Fourth Embodiment

Figure 8:
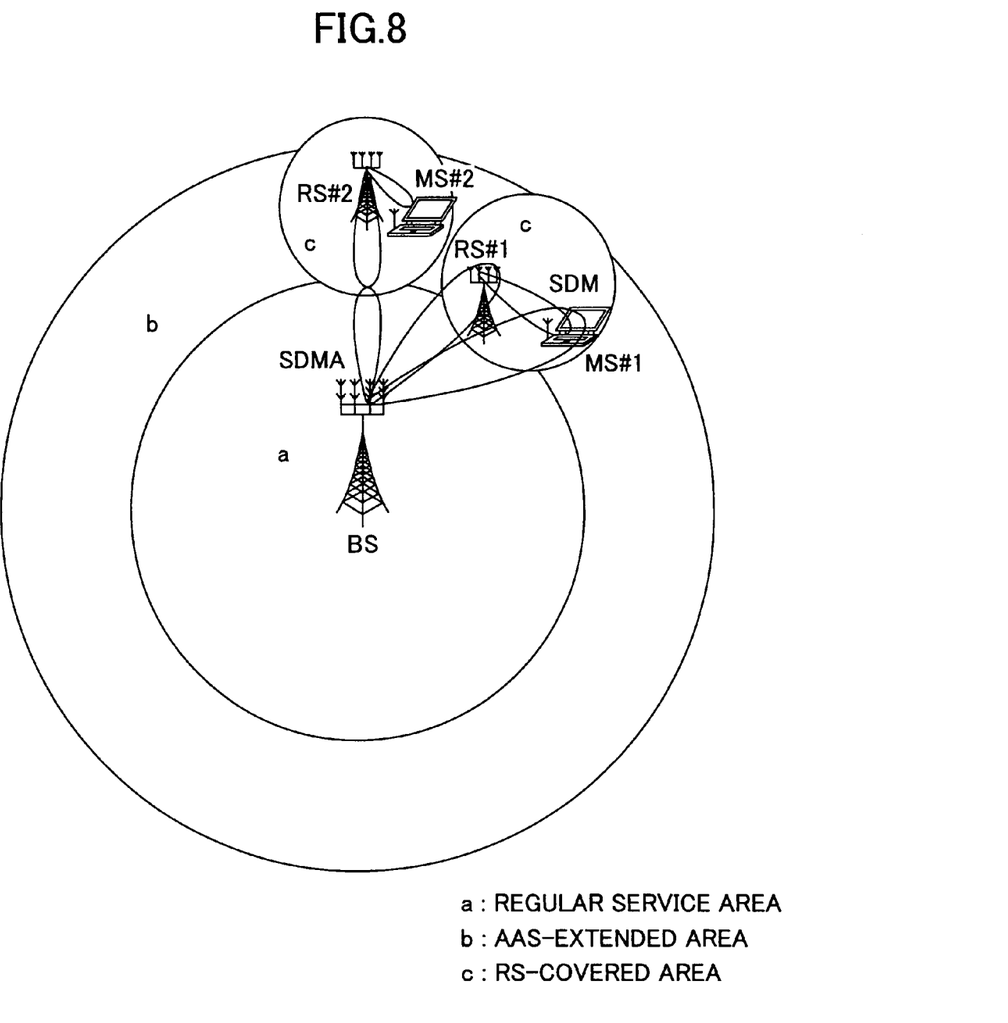
FIG. 8 is a diagram for illustrating a fourth embodiment of the present invention.

FIG. 8 is a diagram for illustrating a fourth embodiment of the present invention. Referring to FIG. 8, a radio communications system has the BS that forms the regular service area a and the AAS-extended area b, and multiple radio relay stations RS#1 and RS#2 provided in the AAS-extended area b. In this radio communications system, each of the RS#1 and RS#2 performs transmission and reception by forming beams based on the adaptive array antenna system. It is also possible to form beams for the MS#1 and the MS#2 in the RS-covered areas c. Further, the BS performs SDMA (Space Division Multiplex Access) to the RS#1 and the RS#2. The BS, the RS#1 and the RS#2, and the MS#1 and the MS#2 have the configurations of the BS, the RS, and the MS, respectively, of FIG. 2. However, each of the RS#1 and the RS#2 further includes the same uplink and downlink beam forming circuits as those of the BS, and its antenna has an array antenna configuration.

Application of SDMA makes it possible for the BS to perform transmission to or reception from both the RS#1 and the RS#2 at the same time through space division without performing time division or frequency division for the RS#1 and the RS#2. Further, beam forming by each of the BS, the RS#1, and the RS#2 makes it possible for the BS to reduce transmission power. Further, formation of a beam in the link between the RS#1 and the MS#1 by the RS#1 makes it possible to form the BS/MS#1 link that transmits user data and the BS/RS#1/MS#1 link that transmits control information independent of each other. The same applies to the RS#2 and the MS#2. Application of this SDM (Space Division Multiplex) technique makes it possible to increase transmission rate.

Fifth Embodiment

Figure 9:
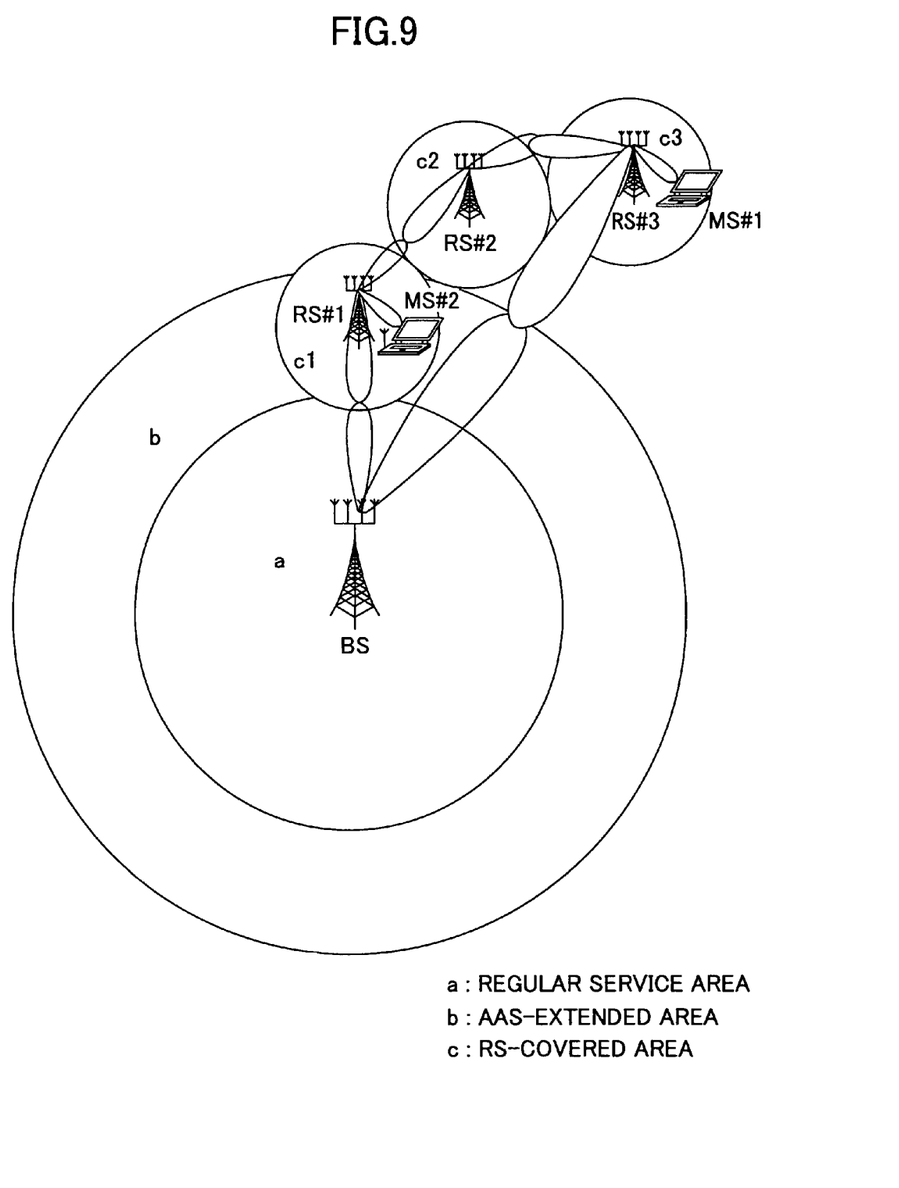
FIG. 9 is a diagram for illustrating a fifth embodiment of the present invention.

FIG. 9 is a diagram for illustrating a fifth embodiment of the present invention. Referring to FIG. 9, the BS forms the regular service area a and the AAS-extended area b. Multiple radio relay stations RS#1, RS#2, and RS#3 form RS-covered areas c1, c2, and c3, respectively. Each of the RS#1, the RS#2, and the RS#3 is configured to be capable of forming a beam. The MS#2 is positioned in the RS-covered area c1 of the RS#1. When the MS#1 moves to the RS-covered area c3 of the RS#3 and performs communications through the BS/RS#1/RS#2/RS#3/MS#1 link, there is a decrease in throughput due to accumulation of processing time through intervention of multiple RSs. Accordingly, the RS#3 forms a link with the BS through its beam forming function. Through application of multi-hop skip, it is possible to perform single-hop communications. In the graphically illustrated situation, the RS-covered area c3 is shown as a service area based on the omnidirectional antenna gain pattern, and the AAS-RS-covered area by beam forming is based on the assumption that it is possible to form a link between the BS and the RS#3 through the AAS-extended area b.

Thus, according to one aspect of the present invention, a terminal outside a regular service area covered by the omnidirectional antenna gain pattern of a radio base station notifies the radio base station of its existence through a radio relay station. Thereby, the radio base station promptly recognizes the network entry of the terminal, and switches to an adaptive array antenna gain pattern so as to direct a beam toward the direction of the serving radio relay station where the terminal is positioned. As a result, a link is promptly established to enable the radio base station and the terminal to perform direct radio communications with each other. Further, by providing the radio relay station with a part configured to form a beam based on an adaptive array antenna gain pattern, it is possible to form multiple links and reduce the number of hops to provide efficient radio communications services.

The present invention is not limited to the specifically disclosed embodiments, and variations and modifications may be made without departing from the scope of the present invention.

The present application is based on Japanese Priority Patent Application No. 2006-222939, filed on Aug. 18, 2006, the entire contents of which are hereby incorporated by reference.

What is claimed is:

1. A radio link forming method in a radio communications system including a relay station, comprising:
   transmitting control information to the relay station based on a first antenna gain pattern by a radio base station; and
   switching the first antenna gain pattern to a second antenna gain pattern and forming a radio link by the radio base station, using beamforming based on the second antenna gain pattern, between the radio base station and a radio terminal outside an area covered by an omni-directional antenna of the radio base station in response to receiving a notification from the relay station, the notification being transmitted by the relay station in response to receiving a response signal from the radio terminal having received the control information transmitted from the relay station.

2. The radio link forming method as claimed in claim 1, further comprising:
   controlling a beam direction in the beamforming by scanning a cover area of the relay station by the radio base station and notifying, by the radio terminal, the radio base station of a reception result of the scan through the relay station.

3. A handover method in a radio communications system including a relay station, comprising:
   transmitting, from the relay station to a radio base station, a request serving as a trigger for switching to direct radio communications using beamforming between a radio terminal and the radio base station in response to a decrease in reception quality with respect to a link between the relay station and the radio terminal communicating with the radio base station through the relay station.

4. A transmission method in a radio communications system including a relay station, comprising:
   transmitting control information based on a first antenna gain pattern using a communications link between a radio terminal and a radio base station through the relay station; and
   switching the first antenna gain pattern to a second antenna gain pattern in response to receiving a notification from the relay station and transmitting user data using a direct radio link using beamforming based on the second antenna gain pattern between the radio base station and the radio terminal without intervention of the relay station.

5. A radio link forming method in a radio communications system including a plurality of relay stations, comprising:
   performing single-hop communications between a radio base station and one of the relay stations by forming a direct radio link using beamforming when a radio terminal is in a cover area of the one of the relay stations, the radio terminal being capable of communicating with the radio base station through the one of the relay stations and at least another one of the relay stations by forming a radio link between the radio terminal and the one of the relay stations.

6. The radio link forming method as claimed in claim 5, wherein the one of the relay stations and the radio terminal are outside an area covered by an omni-directional antenna of the radio base station.

7. A radio communications system including a relay station, comprising:
   a transmitter configured to transmit control information based on a first antenna gain pattern from a radio base station to the relay station; and
   a radio link forming device configured to switch the first antenna gain pattern to a second antenna gain pattern and to form a radio link using beamforming based on the second antenna gain pattern between the radio base station and a radio terminal outside an area covered by an omni-directional antenna of the radio base station in response to receiving a notification from the relay station, the notification being transmitted by the relay station in response to receiving a response signal from the radio terminal having received the control information transmitted from the relay station.

8. A radio communications system including a relay station, comprising:
   a transmitter configured to transmit, from the relay station to a radio base station, a request serving as a trigger for switching to direct radio communications using beamforming between a radio terminal and the radio base station in response to a decrease in reception quality with respect to a link between the relay station and the radio terminal communicating with the radio base station through the relay station.

9. A radio communications system including a relay station, comprising:
   a transmitter configured to transmit control information based on a first antenna gain pattern using a communications link between a radio terminal and a radio base station through the relay station, to switch the first antenna gain pattern to a second antenna gain pattern in response to receiving a notification from the relay station, and to transmit user data using a direct radio link using beamforming based on the second antenna gain pattern between the radio base station and the radio terminal without intervention of the relay station.

10. A radio communications system including a plurality of relay stations, comprising:
   a communication device configured to perform single-hop communications between a radio base station and one of the relay stations by forming a direct radio link using beamforming when a radio terminal is in a cover area of the one of the relay stations, the radio terminal being capable of communicating with the radio base station through the one of the relay stations and at least another one of the relay stations by forming a radio link between the radio terminal and the one of the relay stations.

11. A radio base station in a radio communications system including a relay station, comprising:
   a transmitter configured to transmit control information based on a first antenna gain pattern from a radio base station to the relay station; and
   a radio link forming device configured to switch the first antenna gain pattern to a second antenna gain pattern and to form a radio link using beamforming based on the second antenna gain pattern between the radio base station and a radio terminal outside an area covered by an omni-directional antenna of the radio base station in response to receiving a notification from the relay station, the notification being transmitted by the relay station in response to receiving a response signal from the radio terminal having received the control information transmitted from the relay station.

12. A relay station in a radio communications system, comprising:
   a transmitter configured to transmit, to a radio base station, a request serving as a trigger for switching to direct radio communications using beamforming between a radio terminal and the radio base station in response to a decrease in reception quality with respect to a link between the relay station and the radio terminal communicating with the radio base station through the relay station.

13. A radio base station in a radio communications system including a relay station, comprising:

a transmitter configured to transmit control information based on a first antenna gain pattern using a communications link between a radio terminal and the radio base station through the relay station, to switch the first antenna gain pattern to a second antenna gain pattern in response to receiving a notification from the relay station, and to transmit user data using a direct radio link using beamforming based on the second antenna gain pattern between the radio base station and the radio terminal without intervention of the relay station.

14. A radio base station in a radio communications system including a plurality of relay stations, comprising:

a communication device configured to perform single-hop communications between the radio base station and one of the relay stations by forming a direct radio link using beamforming when a radio terminal is in a cover area of the one of the relay stations, the radio terminal being capable of communicating with the radio base station through the one of the relay stations and at least another one of the relay stations by forming a radio link between the radio terminal and the one of the relay stations.

* * * * *